Figure 1:
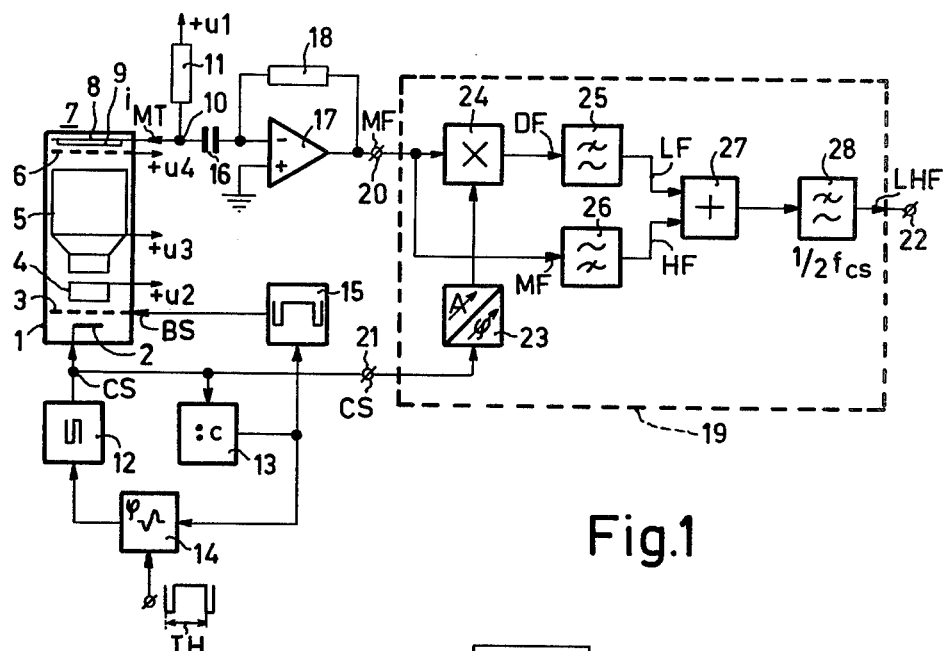

United States Patent [19]

Dechering et al.

[11] 4,174,525

[45] Nov. 13, 1979

[54] TELEVISION CAMERA HAVING LOW-FREQUENCY NOISE CORRECTION

[75] Inventors: Johannes A. B. Dechering; Martinus F. A. M. Geurts, both of Breda, Netherlands

[73] Assignee: U.S. Philips Corporation, New York, N.Y.

[21] Appl. No.: 850,233

[22] Filed: Nov. 10, 1977

[30] Foreign Application Priority Data

Dec. 1, 1976 [NL] Netherlands ................... 7613357

[51] Int. Cl.² ............................................. H04N 5/34
[52] U.S. Cl. ........................................................... 358/217
[58] Field of Search ............... 358/217, 219, 221, 218, 358/220, 222–224, 167

[56] References Cited

U.S. PATENT DOCUMENTS 2,293,899   8/1942   Hanson ................................. 358/217

FOREIGN PATENT DOCUMENTS 1021143   3/1966   United Kingdom ...................... 358/217

*Primary Examiner*—John C. Martin
*Attorney, Agent, or Firm*—Thomas A. Briody; William J. Streeter; Edward W. Goodman

[57] ABSTRACT

A television camera features an oscillator signal which modulates the video signal to eliminate microphonics. The signal is applied to the cathode to reduce the required power. It can be a multiple of the line frequency to simplify frequency generation.

12 Claims, 7 Drawing Figures

TELEVISION CAMERA HAVING LOW-FREQUENCY NOISE CORRECTION

The invention relates to a television camera comprising a television pick-up tube and a correction circuit for low frequency signal noise, microphonics in particular, which television pick-up tube is provided with an electron gun comprising a cathode and a control and accelerating electrode respectively, a target plate, a mesh electrode disposed near the target plate and causing microphonics in particular and a picture signal output of the pick-up tube coupled to the target plate.

A television camera provided with a microphonics correction circuit is inter alia disclosed in German Auslegeschrift 2,138,738 where it is proposed to include, in the signal path connected to the picture signal output a blocking filter which is tuned to the frequency of the noise signals caused by the microphonics produced by the vibrating mesh electrode. It is disclosed that the noise signals produced by the mechanical or acoustical vibrations have a frequency of approximately 1.5 to 3 kHz. Filtering the signals occurring in this frequency band causes not only the microphonic noise signals but also the picture signals occurring in this band to be removed which results in a deterioration in the quality of the displayed television picture.

It is an object of the invention to provide a television camera comprising a correction circuit for a low frequency signal noise such a microphonics, hum of power supplies, cross-talk of deflection fields etc. which generates a picture signal which on display thereof does not result in a picture having an unacceptable deterioration in the quality. The camera according to the invention is therefore characterized in that in the television camera the cathode of the electron gun is connected to a signal output of an oscillator wherein the peak-to-peak value of the oscillator signal on the cathode exceeds the local maximum potential variation on the target plate occurring at a local maximum illumination present in a scene to be televised and the oscillator frequency is equal to or higher than twice the highest standardized picture signal frequency and wherein the picture signal output of the pick-up tube with the modulated picture signal is coupled to an amplitude demodulation circuit for obtaining an unmodulated, noise-corrected picture signal.

The invention is based on the recognition that by modulating the cathode potential with the oscillator frequency during the line scan periods it is possible to allocate a characteristic to the picture signal which is not present in the noise signals such as microphonics which are mainly produced by the vibrating mesh electrodes. This characteristic is a carrier on which the picture information is present in amplitude-modulated form because with the oscillator frequency the cathode potential is made so high that the electron beam cannot land on the target plate as a lower potential, which is dependent on the local scene brightness is present thereon. The cathode potential is made so high that also with a local maximum brightness and the maximum increase in potential on the target plate occurring therewith it is all times guaranteed that the interruption of the landing takes place. By means of amplitude demodulation of the carrier with the picture information thereon (in the form of the so-called anode modulation) this carrier is obtained without the microphonics noise signals being present therein.

A television camera according to the invention has a further improvement in the picture quality in connection with a presence of a possible brightness modulation if this shows the characteristic that the oscillator frequency is a whole multiple of the television line frequency.

An embodiment of a television camera with the correction circuit for the low frequency noise and therewith a measure for noise improvement is characterized in that the amplitude-demodulation circuit is provided with an amplitude-demodulator, a low-pass filter and a high-pass filter having filter characteristics which are complementary, the output of the demodulation circuit being connected through the high-pass filter directly and through the low-pass filter in series with the amplitude-demodulator to an input of the demodulation circuit which input carries the modulated picture signal.

As forming complementary filters is simpler for low- and high-pass filter then for low- and bandpass filters and embodiment of a television camera is in addition characterized in that the output of the demodulation circuit is connected through a low-pass filter having the picture signal bandwidth to the complementary low- and high-pass filters.

The noise improvement is obtained by using of the demodulated picture signal only a low-signal frequency band (0 to, for example, 15 kHz), and of a modulated picture signal only the subsequent picture signal band (of, for example, 15 mHz to 5 kHz) for forming the output picture signal.

As using the noise correction according to the invention is accompanied by a noise increase in the low frequency band an embodiment of a television camera is characterized for a further increase in the picture quality in that the camera comprises a noise detector which for control is connected to a switch-over device through which, on the one hand the cathode of the pick-up tube is coupled to the oscillator output or a D.C. voltage and, on the other hand, a camera output is coupled through the amplitude-demodulation circuit or directly to the picture signal output of the pick-up tube.

In this way it is accomplished that the microphonics correction circuit only operates in the presence of microphonics noise signals and is switched off in the absence thereof so that the camera operates in a conventional manner.

A camera embodiment suitable for an application wherein the noise can be partly compensated, is characterized in that the camera is provided with a noise detector which is connected for control to a commutator which connects the cathode of the pick-up tube to the oscillator output or a D.C. voltage and to a potentiometer tap which is connected to a camera output, whilst the potentiometer terminals are on one side coupled to the amplitude-demodulation circuit and on the other side through a delay device and a low-pass filter to the picture signal output of the pick-up tube.

Figure 3:
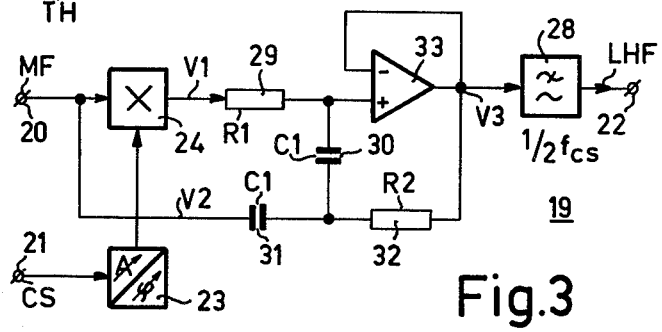
Figure 4:
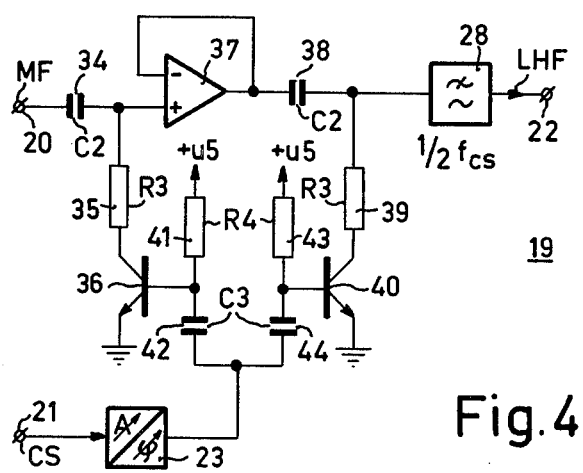
Figure 2:
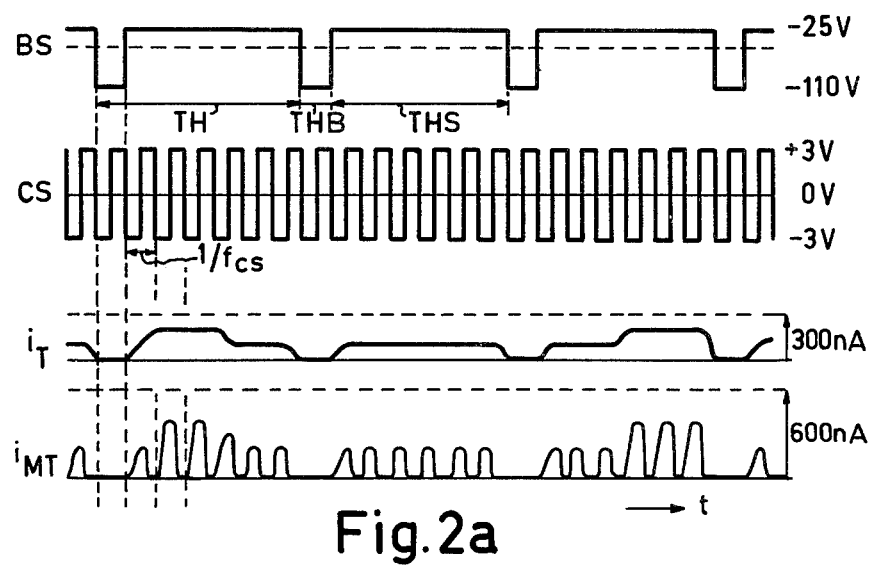
Figure 2:
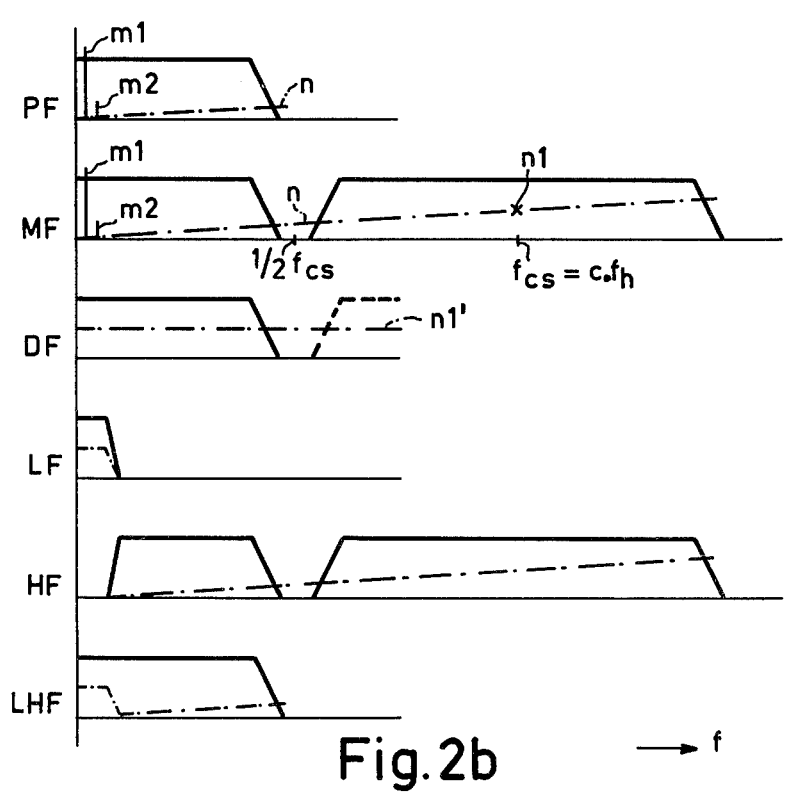
Figure 5:
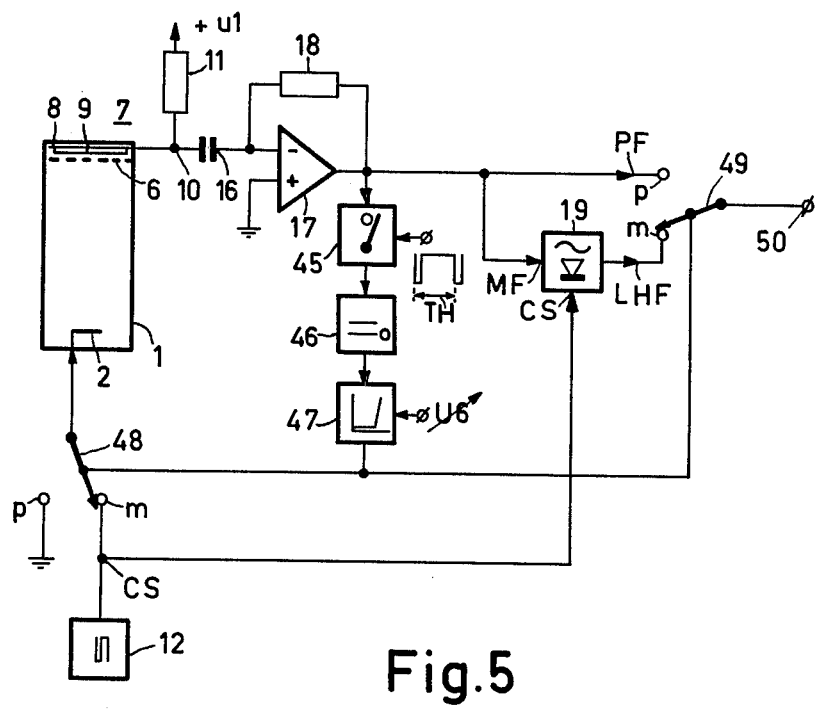
Figure 6:
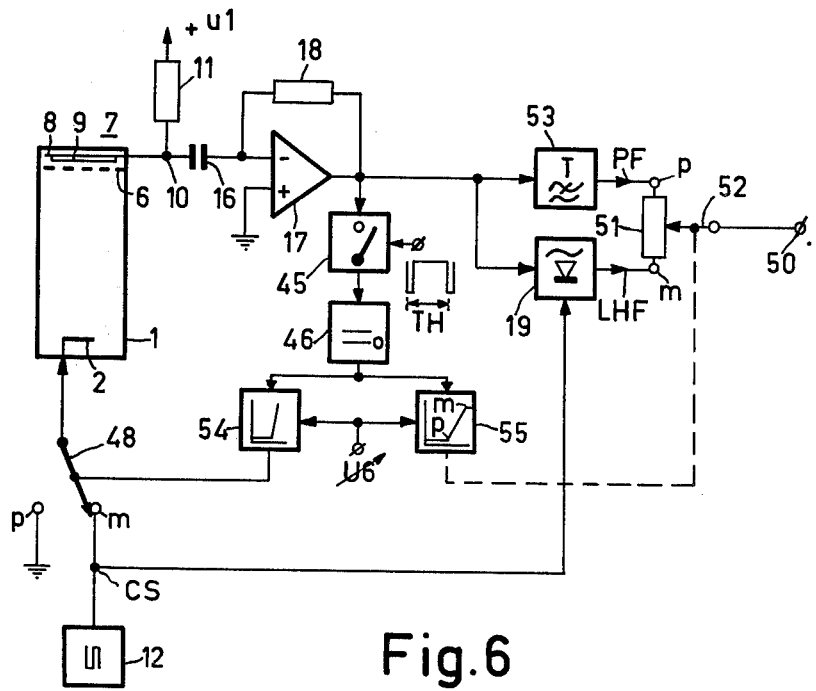

The invention will be further explained by way of non-limitative example with reference to the following figures wherein FIG. 1 shows block-diagrammatically an embodiment of a television camera according to the invention, FIG. 2 shows in FIG. 2a voltage and current curves versus the time and in FIG. 2b amplitude-frequency diagrams;

FIGS. 3 and 4 show embodiments of a demodulation circuit for the camera according to FIG. 1, FIG. 5 shows a camera embodiment having a noise correction circuit which automatically switches on and off and FIG. 6 show a camera embodiment wherein the noise is partly compensated in an automatic manner.

In the television camera shown in FIG. 1 reference 1 indicates a television pick-up tube in the form of a diagrammatic drawing which shows only those components which are relevant for explaining the invention. Deflection, focussing centring and other means have been omitted. The television camera of FIG. 1 which is given by way of example may, for example, be a black-white camera or one tube of a colour television camera. Field of application may be a studio camera, a camera for outdoor recordings, an X-ray television camera etc., that is to say everywhere where noise is found, in particular microphonics signals which caused by acoustical and mechanical vibrations.

Reference 2 indicates a cathode in the pick-up tube 1. A control electrode is indicated by 3, two accelerating electrodes by 4 and 5, a mesh electrode by 6 and a target plate by 7. So the pick-up tube 1 is provided with an electron gun (2, 3, 4) for generating an electron beam which, under the control of deflection means, not shown, scans the target plate 7 line and frame-wise in a manner customary for television. The target plate 7 consists, for example, of a transparent, electrically conducting signal electrode 8 and a semiconductor layer 9 applied thereon. The signal electrode 8 of the target plate 7 is connected to a signal output 10 of the pick-up tube 1 which output 10 is connected through a resistor 11 to a power-supply terminal having a voltage +ul of, for example, 45 V. The electrodes 4, 5 and 6 are connected to power supply terminals having voltages +u2, +u3 and +u4 respectively, which have, for example, the values 300, 600 and 800 V-respectively.

With a pick-up tube 1 of the type described, mechanical and acoustical vibrations may cause the cathode 2 and the electrodes 3 to 6 inclusive to start vibrating and in particular, the mesh electrode 6. The mesh electrode 6 forms as it were the vibrating diaphragm in a capacitor microphone of which in addition the target plate 7 is part. A voltage of approximately +45 V(+ul) is found on the signal electrode 8 of the target plate 7 and a voltage of +800 V(+u4) on the mesh electrode 6. The vibrating mesh electrode 6 produces a signal at the output 10 which is indicated as a microphonics noise signal and occurs with frequencies of 1.5 to approximately 3 kHz. In addition, at the output 10 a desired picture signal is found which is produced by the electron beam scan of the semiconductor layer 9 of the target plate 7. In the place of incidence of the beam the (determined) potential present on the cathode 2 is impressed at a discharge of the electric charge on the semiconductor layer 9 which is obtained by the light-dependent, local leakage current in the preceding time equal to a field period. By way of example it holds that with a local maximum illumination the potential on the free surface of the semiconductor layer 9 can have risen by not more than 5 V in the time equal to the duration of a field period, between two successive local scannings by the electron beam.

It appears from the preceding that the signal available at the output 10 of the pick-up tube is composed of the desired picture signal components, depending on he local leakage current in the semiconductor layer 9 and the microphonics noise signals mainly originate from the mesh electrode 6 which vibrates relative to the target plate 7. The picture signal and microphonics noise signal come from two separate sources; the signals are fully independent of one another, they are uncorrelated. Besides the microphonics as an uncorrelated low-freuency noise, hum of power supplies and cross-talk of deflection fields to the target plate 7 may be mentioned as examples.

To be able to separate (microphonics) noise from the picture signal components, the television camera of FIG. 1 is provided with an oscillator 12 which is connected at the signal output with the cathode 2 of the pick-up tube 1. The oscillator signal is indicated by CS and in FIG. 2a the voltage curve is plotted versus the time t. In FIG. 2a the oscillator signal CS is plotted as a square-wave voltage between values +3 and −3 V. Instead of the square-wave signal a sinusoidal oscillator signal CS might have been drawn. For simplicity of the drawing the square-wave form is given but in practice the sinusoidal form will be used with advantage owing to the absence of higher harmonics.

In FIG. 2a $i_T$ shows a current curve of the current to the target plate 7 such as this current might occur with normal use of the pick-up tube 1 in dependency on the televised scene. To illustrate the various periodically occurring time periods in television, such as a line period TH, a line scanning time THS and a line blanking time THB they are plotted in FIG. 2a at a line blanking signal BS. In the camera of FIG. 1 the line blanking signal BS, with pulses between −25 and −110 V, is supplied to the control electrode 3 of the pick-up tube 1. It is assumed that the current $i_T$ can increase from zero in the line blanking time THB to a maximum of 300 nA at a local maximum illumination of the target plate 7 or, put differently, the pick-up tube 1 is adjusted with a maximum current of 300 nA for the electron beam near the target plate 7.

For operating the pick-up tube 1 in accordance with the invention the maximum electron beam current is increased to 600 nA as is plotted at a current curve $i_{MT}$ in FIG. 2a. In addition the oscillator signal CS of FIG. 2a is present on the cathode 2 and the peak-to-peak value of 6 V results, taking the maximum potential variation of 5 V on the semiconductor layer 9, given above, into account, in that at the value +3 V in the signal CS the electron beam can never land on the semiconductor layer 9 of the target plate 7. Namely, the cathode potential then exceeds the maximum possible potential on the semiconductor layer 9. The result is that, instead of the current curve $i_T$ the current curve $i_{MT}$ is obtained. Increasing the electron beam current appeared to be necessary to be able to remove the charge on the semiconductor layer 9 in half the normal time. For simplicity FIG. 2a shows that only a few (6) cycles $1/f_{cs}$ of the oscillator signal CS occur in the line scanning times THS. In practice the oscillator frequency $f_{cs}$ must be equal to or higher than twice the highest, standardized picture frequency of, for example, 5 MHz, so that the oscillator frequency $f_{cs}$ must be in the order of magnitude of 10 MHz. It is advantageous to make the oscillator frequency $f_{cs}$ a whole multiple(c) of the line frequency $f_h$. By way of example it holds that $f_h = 15,625$ Hz, c=640 and $f_{cs}=10$ MHz. As a consequence the spot-wise scanning of the semiconductor layer 9 always occurs in the same places which prevents that the value (brightness) of the picture signal somewhat fluctuates with a frequency equal to the smallest difference between the oscillator frequency $f_{cs}$ and a multiple of the line frequency $f_h$. For completeness it should be noted that, although the electron beam does alternatingly land and not land on the semiconductor layer 9 only a little charge remains on this layer after the beam has passed; namely, the diameter of the beam exceeds the distance the beam travels between two successive landings. Furthermore it should be noted that as additional effect a modulation, which may be neglected in practice, of the current strength of the electron beam occurs because the cathode voltage slightly varies relative to the control electrode voltage; by having the latter vary also this effect can, if so desired, be compensated for in a simple manner.

FIG. 2b shows some amplitude frequency diagrams. A frequency diagram PF is associated with the current curve $i_T$ of FIG. 2a. A picture or video signal band, a noise n present therein which increases linearly versus the frequency f, and microphonics noise signals m1 and m2, are plotted versus the frequency f. The microphonics noise signal m2 is plotted as a higher harmonic of the noise signal m1. MF indicates a frequency diagram which is associated in a corresponding manner with the current curve $i_{MT}$ of FIG. 2a; it concerns here an amplitude modulated signal ($i_{MT}$) having in the frequency diagram a picture signal baseband to a frequency of approximately $\frac{1}{2}$ $f_{cs}$ and a picture signal modulated with the oscillator frequency $f_{cs}=c.f._h$. The line n1 indicates the noise component at the oscillator frequency $f_{cs}$. The frequency diagram MF is associated with a signal which has been subjected to the so-called anode modulation.

The further diagrams of FIG. 2b will be described with reference to the camera of FIG. 1. The output of the oscillator 12 is connected through a frequency divider 13 having a divider c to an input of a phase control circuit 14 and a signal generator 15 respectively. An external synchronisation signal with the line period TH is applied to a further input of the control circuit 14 and the output thereof is connected to the oscillator 12 for the purpose of phase control. The signal generator 15 supplies the line blanking signal BS of FIG. 2a to the control electrode 3 of the pick-up tube 1.

The picture signal output 10 of the pick-up tube 1 is connected through an isolating capacitor 16 to an inverting input of a difference amplifier 17 whose non-inverting input is connected to ground. The output of the amplifier 17 is fed back to the inverting input through a resistor 18. The camera shown in FIG. 1 comprises an amplitude demodulation circuit 19 which is provided with an input 20 and 21 respectively which is connected to the output of the amplifier 17 and oscillator 12 respectively and with an output 22. At the input 20 a signal is found having the frequency diagram MF of FIG. 2b whilst the input 21 carries the oscillator signal CS. The input 21 is connected to an amplitude and phase setting circuit 23 whose output is connected to an input of an amplitude demodulator 24, to an other input of which the input 20 of the demodulation circuit 19 is connected. In FIG. 1 the demodulator 24 is constructed in known manner as a multiplier in which, for amplitude demodulation the signal having the frequency diagram MF is multiplied by the oscillator signal CS whose amplitude and phase are matched for obtaining an output signal of the demodulator 24 with a desired amplitude. The phase setting is mainly determined by the required correction of the electron transit time in the pick-up tube 1 which may be approximately 30 to 35 ns. The amplitude setting is, as will appear, of importance for the use of a determined low-pass filter 25 subsequent to the demodulator 24 and of a determined high-pass filter 26 directly connected to the input 20. The outputs of the filters 25 and 26 are connected to inputs of an adder circuit 27 which is connected through a low-pass filter 28 to the output 22. The outputs of the demodulator 24, the filters 25, 26 and 28 carry signals whose respective frequency diagrams are shown in FIG. 2b as DF, LF, HF and LHF.

From the frequency diagram DF of FIG. 2b it appears that the amplitude-demodulated signal of which only the baseband is shown in full has a noise n1' with an approximately flat variation. The noise n1' is related to the noise n1 in the frequency diagram MF whose associated signal is double sideband demodulated. If the value of the noise n1' on display of the demodulated signal will result in an acceptable picture quality, the signal having the frequency diagram DF can be utilized for the display without further processing.

In the case the value of the noise n1' might be unacceptable for the picture quality the filters 25 and 26 can be used with advantage. From the demodulated signal having the frequency diagram DF only the low frequency portion corresponding with the frequency diagram LF is utilized and from the modulated signal having the frequency diagram MF the higher frequency portion (frequency diagram HF) is partly utilized (through filter 28) for the unmodulated noise-corrected signal having the frequency-diagram LHF. From FIG. 2b it appears that the signal having the frequency diagram LHF has only the increased noise n1' in the low-frequency portion. An in practice acceptable limit appears to be at approximately 15 kHz, that is to say that there is the cross-over point for the filter characteristics of the low-pass filter 25 and the high-pass filter 26.

From FIG. 2b it appears that the signal at the output 22 of the demodulation circuit 19 has a frequency diagram LHF which is composed of the portions of the two frequency diagrams LF (0 to 15 kHz) and HF (15 kHz to approximately 5 MHz). Herein the requirement holds that the amplitude frequency diagram LHF obtained after combining remains flat and does not show irregularities at said cross-over point (15 kHz), that is to say the filters 25 and 26 must have complementary filter characteristics. In addition the requirement holds that in the presence of complementary filter characteristics the amplitude of the signals supplied to the filters 25 and 26 must be equal as an inequality likewise results in an inequality in the variation of the amplitude frequency diagram LHF.

Instead of using the high-pass filter 26 and the subsequent low-pass filter 28 a single band-pass filter (26') might be used which only passes the lowest band of the signal shown in FIG. 2b which has the frequency diagram HF. However, in practice it appears that it is simpler to construct a low-pass filter (25) and a high-pass filter (26) in a complementary manner than a low-pass filter (25) and a band-pass filter (26'). Therefore the use of the additional low-pass filter 28 having a picture signal bandwidth to $\frac{1}{2}$ $f_{cs}$ should be prepared.

The embodiment of the camera shown in FIG. 1 comprises only the components which are important for understanding the operation. Signal processing, clamp and correction circuits are not shown. It is pointed out, however, that the feedback amplifier (17, 18) must have a wide bandwidth and a flat frequency and phase characteristic and must give the lowest possible amount of intermodulation distortion. As example it holds that for the oscillator frequency $f_c=10$ MHz the $-3$ dB point in the grain characteristic must be at 20 MHz or higher.

Furthermore it holds that when using a signal the clamping circuit at the amplifier 17, this circuit must have so great a time constant, that is to say must be so slow, that clamping circuit does not affect the microphonics noise signal in an unacceptable manner.

In the preceding it was shown that to prevent a brightness variation in a displayed picture it is advantageous to choose the oscillator frequency as a whole multiple of the line frequency ($f_{cs}=c.f_h$). Furthermore, this choice offers the advantage that a constant pulse compensation can be applied against a black level which varies within the line scanning time THS in accordance with the step response of the high and low-pass filters, owing to cross-talk phenomena from the line blanking times THB. The pulse compensation is performed by adding a pulse, whose amplitude is adjustable but which is otherwise arbitrary, to the output signal of the amplifier 17 during the line blanking times THB. With another frequency choice the phase of the oscillator signal is not constant relative to the line frequency pulses so that there is no sense in constant pulse compensation.

FIG. 3 shows a more detailed embodiment of the demodulation circuit 19 wherein, as well as in the following figures corresponding components have been given the same reference numerals. The output of the demodulator 24 is connected through a resistor 29 and a capacitor 30 to the node in a series arrangement of a capacitor 31 and a resistor 32, the other terminal of capacitor 31 being connected to the input 20. The node of the resistor 29 and the capacitor 30 is connected to a non-inverting input of a difference amplifier 33. The inverting input of the amplifier 33 is connected to the amplifier output which is also connected to the resistor 32 in the series arrangement of the capacitor 31 and the resistor 32 and to the input of the low-pass filter 28. The amplifier 33 operates as a separating stage.

FIG. 3 shows the values R1 and R2 respectively of the resistors 29 and 32 and a similar value C1 at the capacitors 30 and 31. The demodulator 24 supplies a voltage V1, at the input 20 a voltage V2 is found and at the output of the amplifier 33 the voltage V3. In this manner a low-pass characteristic is present between the input voltage V1 and the output voltage V3 having as computable filter characteristic (F25):

$$F25(jw) = \frac{1 + 2j \cdot a}{1 + 2j \cdot a - b} \quad (1) \text{ with } w = \text{angular frequency and}$$
$$a = \frac{w}{w_n}(\frac{R2}{R1})^{\frac{1}{2}}, \ b = (\frac{w}{w_n})^2 \text{ and } w_n = \frac{1}{C1(R1 \cdot R2)^{\frac{1}{2}}}$$

For the high-pass characteristic present between the input voltage V2 and the output voltage V3 a filter characteristic (F26) can be derived:

$$F26(jw) = \frac{-b}{1 + 2j \cdot a - b} \quad (2)$$

It follows that
$$F25(jw) + F26(jw) \equiv 1 \quad (3)$$

that is to say the pass characteristics are complementary. For the output voltage V3 of the complementary low-high pass filter of FIG. 3 it follows $$V3 = F25(jw).V1 + F26(jw).V2 \quad (4)$$

and in the preceding it has been mentioned that there must hold: value V1=value V2 in order that the signal at the output 22 has the frequency diagram LHF shown in FIG. 2b.

In practice a filter construction appears to be applicable for which it holds that C1=2.2 nF and R1=R2=4.7 kOhm.

FIG. 4 shows an embodiment of the demodulation circuit 19 in which the demodulator 24 and the low-(25) and high-pass filter (26) are harder to find, the operation, however, is in a similar manner. The input 20 of the demodulation circuit 19 is connected through a series arrangement of a capacitor 34, a resistor 35 and the collector-emitter path of an npn transistor 36 to a ground terminal. The node of the capacitor 34 and the resistor 35 is connected to the non-inverting input of a difference amplifier 37 which operates as separating stage. The inverting input of the amplifier 37 is connected to the amplifier output and both are connected through a series arrangement of a capacitor 38, a resistor 39 and the collector emitter path of an npn transistor 40 to a ground terminal. The base of the transistor 36 is connected through a resistor 41 to a terminal having a voltage +u5 and through a capacitor 42 to the output of the amplitude and phase setting circuit 23. The base of the transister 40 is through-connected in an identical manner through a resister 43 and a capacitor 44. The node of the capacitor 38 and the resistor 39 is connected to the input of the low-pass filter 28. In FIG. 4 it is shown that the capacitor 34 and 38 and 42 and 44 respectively have a capacitance C2 and C3 respectively and that the resistors 35 and 39, and 41 and 43 respectively have a value of R3 and R4 respectively.

The demodulation circuit 19 of FIG. 4 is provided with two, on-off controlled switching stages (36, 41, 42) and (40, 43, 44) through which two RC filters (34, 35) and 38, 39) are periodically, simultaneously switched on and off during a portion of the oscillator cycle 1/$f_{cs}$. A switch-on time of 0.4 times the oscillator cycle gives in practice a properly operating demodulation circuit 19. Herein the modulated picture signal having a signal diagram MF is demodulated and thereafter filtered by a low-pass filter (25) having the filter characteristic (F25):

$$F25(jw) = \frac{1 + 2jd}{1 + 2jd - d^2} \quad (5)$$

where w=angular frequency, $$d = \frac{w}{w_n} \text{ and } w_n = \frac{0.4}{C2 \cdot R3}$$

The non-modulated portion in the frequency diagram MF of the picture signal, the said baseband, which possibly contains the microphonics noise signal is filtered by a high-pass filter (26) having the filter characteristic (F26):

$$F26(jw) = \frac{-d^2}{1 + 2jd - d^2} \quad (6)$$

From (5) and (6) it follows that the filter characteristics are complementary as it holds that $$F25(jw) + F26(jw) \equiv 1 \quad (7)$$

The above-mentioned formulas (5, 6 and 7) can be derived by means of a Fourier transform of a sampling pulse series of an amplitude-modulated signal wherein the switch-on time of the transistors 36 and 40 is equal to the 0.4th part of the oscillator cycle of 100 ns. For simplicity the computation is omitted. For the embodiment of a practical circuit the following values are given:

$$C2=10nf, R3=470\Omega, C3=1nF, R4=10k\Omega.$$

When constructing the demodulation circuit 19 of FIG. 3 with R1=R2 this gives that, when comparing the formulas (1) and (5) and (2) and (6) respectively the filter characteristics are equal.

FIG. 5 shows a camera embodiment having a noise or microphonics correction circuit which automatically switches on and off. To that end the camera is provided with an on-off switch 45 which is connected to the output of the amplifier 17 and to which a switching signal having a line period TH is supplied which ensures that the switch 45 can pass a signal only during line blanking times THB. Switch 45 is followed by a series arrangement of a rectifying and smoothing circuit 46 and a threshold circuit 47 to which an adjustable voltage U6 is applied for setting the threshold. The threshold circuit 47 supplies a switch-over signal to two commutators 48 and 49 which together constitute a switch-over device (48, 49). In practice the switch-over device (48, 49) is provided with electronic components. The camera shown in FIG. 5 comprises, in the manner described, a noise or microphonics detector (45, 46, 47).

The commutators 48 and 49 are each provided with two selector contacts p and m. There is a through-connection of the contacts p when the noise detector (45, 46, 47) detects no noise (microphonics) and in the case noise is detected the contacts m are throughconnected. The noise detection is only performed in the line blanking times THB in which the noise can occur but not the picture signal. Namely, the electron beam is suppressed in the line blanking times THB but the noise source which is independent of the line scanning can be active.

The p-contact of the switch 48 is connected to ground and the m-contact is connected to the output of the oscillator 12. The square-wave or sinusoidally changing oscillator signal CS which, for example, varies between 0 and +6 V or the ground potential of 0 V is supplied to the cathode 2 depending on whether there is or there is no microphonics detection. The output of the amplifier 17 is connected through the demodulation circuit 19 and the m-contact, or directly through the p-contact of the commutator 49, to an output 50 of the camera so that either the signal having the frequency diagram LHF or the signal having the frequency diagram PF of FIG. 2b, in both cases without or with little microphonics, is found on the output 50.

The embodiment of the television camera shown in FIG. 5 is especially of importance for studio cameras for which high quality demands are made as respect noise in the picture signal. The noise increases always present in the low frequency part of the frequency diagram LHF of FIG. 2b can be unacceptable if balanced against an occasional occurrence of microphonics noise signals. The microphonics detection and the subsequent switching on of the correction circuit only furnishes the advantage that instead of the microphonics which appears in a very disturbing manner on display of the picture signal there is an in all respects acceptable picture with more noise than in normal operation. It goes without saying that the correction circuit which switches on/off automatically can be used everywhere where the low frequency noise increase is considered to be unwanted.

With the camera embodiment shown in FIG. 6 the disturbance can be partly compensated. To that end the commutator 49 of FIG. 5 is replaced by a potentiometer 51 in FIG. 6. The potentiometer 51 is provided with a tap 52 which is connected to the camera output 50 whilst the terminals m and p are connected to the output of the amplifier 17 through the demodulation circuit 19 and through a delay device and low-pass filter 53 respectively. The delay time T of the delay device and low-pass filter 53 is used for compensating the delay time of the demodulation circuit 19 whilst the low-pass filter has a bandwidth up to $f_{cs}/2$. Furthermore, instead of the single threshold circuit 47 of FIG. 5 there are a first threshold circuit 54 and a second threshold circuit 55 which are connected for control to the commutator 48 and the potentiometer tap 52 respectively. The threshold circuit 54 of FIG. 6 is identical to the threshold circuit 47 of FIG. 5 and has a pass characteristic with a steep transition. That is to say that when the threshold voltage is exceeded the output signal of the threshold circuit 54 immediately changes from a given value to another value. With this transition the switch-over of commutator 48 takes place. The threshold circuit 55 on the contrary has a smooth transition between two values (p and m). With this smooth transition the potentiometer tap 52 is moved between the extreme positions (p and m). The result is that in case of a slight noise (microphonics) which just exceeds the threshold of the threshold circuit 54 the contact m of the commutator 48 is connected to the cathode 2 whilst the potentiometer tap 52 is near the terminal p. An increase in the noise results in that the potentiometer tap 52 travels, controlled by the threshold circuit 55, to the terminal m and arrives there at the value (m) of the smooth transition at the threshold circuit 55. It has then been achieved that with a low noise the correction circuit 19 contributes in a very small degree only to the picture signal present at the camera output 50 so that there is also a very low increase in noise. Compared with the abrupt switch-over of the commutator 49 of FIG. 5 the use of the potentiometer 51 has a smooth transition between noise reduction and noise increase.

The microphonics correction circuits described above can be used for both black-white and colour television cameras. In the latter case each pick-up tube of a camera provided with several pick-up tubes can be connected to a separate demodulation circuit 19, whilst they have the oscillator 12 in common.

What is claimed is:

1. A television camera comprising a television pick-up tube and a correction circuit for low frequency signal noise, said television pick-up tube including an electron gun comprising a cathode, and control, and an accelerating electrode respectively, a target plate disposed opposite said gun, a mesh electrode disposed near the target plate and causing low frequency noise, and a picture signal output of the pick-up tube coupled to the target plate; an oscillator coupled to said cathode, wherein the peak-to-peak value of the oscillator signal on the cathode exceeds the local maximum potential variation on the target plate occurring at a local maximum illumination present in a scene to be televised and the oscillator frequency is at least equal to twice the highest standardized picture signal, frequency, and an amplitude-demodulation circuit means coupled to said picture signal output for obtaining an unmodulated noise corrected picture signal.

2. A television camera as claimed in claim 1, wherein the oscillator frequency is a whole multiple of the television line frequency.

3. A television camera as claimed in claim 1 wherein the amplitude-demodulation circuit comprises an amplitude demodulator coupled to said output, a low-pass filter coupled to said demodulator, a high-pass filter coupled to said output and having filter characteristics which are complementary with respect to said low-pass filter, and an output of the demodulation circuit being coupled to the high-pass filter and the low-pass filter.

4. A television camera as claimed in claim 3, further comprising a low-pass filter having the picture signal bandwidth coupled between the complementary low- and high-pass filters and the demodulator circuit output.

5. A television camera as claimed in claim 4, wherein the complementary low- and high-pass filters have a filter characteristic with the cross-over point at approximately 15 kHz.

6. A television camera as claimed in claim 4, wherein the complementary low- and high-pass filters comprise a series arrangement connected to the amplitude demodulator output of a first resistor and a first capacitor and a series arrangement connected to the input of the demodulation circuit of a second capacitor and a second resistor respectively, wherein the node of the second capacitor and the second resistor is connected to the terminal of the first capacitor which is not connected to the first resistor, and further comprises an amplifying stage, wherein the node of the first resistor and the first capacitor is connected to an input of the amplifying stage and the terminal of the second resistor whcih is not connected to the second capacitor is connected to the output of the amplifying stage.

7. A television camera as claimed in claim 4, wherein the low- and high-pass filters are combined with the amplitude-demodulator, the input of the demodulation circuit being connected through a first series arrangement of a capacitor, a resistor, and an on/off controlled switching stage to a voltage terminal, and further comprising an amplifying stage, the node of said capacitor and said resistor being connected through said amplifying stage and a second series arrangement of a capacitor, a resistor, and an on/off controlled switching stage to the voltage terminal, the node of the capacitor and the resistor in the second series arrangement being coupled to the output of the demodulation circuit, the inputs of the switching stages are coupled for their control to the oscillator.

8. A television camera as claimed in claim 1, further comprising a noise detector, a switchover device means coupled for control to said noise detector for providing that the cathode of the pick-up tube is coupled either to the oscillator output or a D.C. voltage and a camera output is coupled either through the amplitude-demodulation circuit or not through said demodulation circuit to the picture signal output of the pick-up tube.

9. A television camera as claimed in claim 1, further comprising a noise detector, a commutator means coupled for control to said noise detector for providing that the cathode of the pick-up tube is coupled either to the oscillator output or a D.C. voltage, said noise detector being also coupled for control of a potentiometer tap which is connected to a camera output, the potentiometer terminals are on one side coupled to the amplitude-demodulation circuit and on the other side through a delay device and a low-pass filter to the picture signal output of the pick-up tube.

10. A television camera as claimed in claim 9, wherein the noise detector comprises a series arrangement of an on-off switch means for passing the signal in the line blanking times, a rectifying and smoothing circuit, and a threshold circuit.

11. A television camera as claimed in claim 10, wherein the noise detector comprises a first and a second threshold circuit which are connected to the commutator and the potentiometer tap respectively, wherein the first threshold circuit has a pass characteristic with a steep transition and the second threshold circuit a pass characteristic with a smooth transition.

12. A television camera as claimed in claim 8, wherein said noise detector comprises a series arrangement of an on-off switch means for passing the signal in the line blanking times, a rectifying and smoothing circuit, and a threshold circuit.

* * * * *